US006434919B2

(12) United States Patent
Schick

(10) Patent No.: US 6,434,919 B2
(45) Date of Patent: Aug. 20, 2002

(54) RAISEABLE MOWER DECK

(75) Inventor: Scott A. Schick, Corydon, IA (US)

(73) Assignee: Shivvers Group Incorporated, Corydon, IA (US)

( * ) Notice: Subject to any disclaimer, the term of this patent is extended or adjusted under 35 U.S.C. 154(b) by 0 days.

(21) Appl. No.: 09/192,025

(22) Filed: Nov. 13, 1998

(51) Int. Cl.$^7$ .............................................. A01D 36/64
(52) U.S. Cl. .................................. 56/15.9; 56/DIG. 22
(58) Field of Search ........................... 56/15.1, 15.2, 56/15.9, 16.7, 17.1, DIG. 22, 14.7, 320.1, 320.2

(56) References Cited

U.S. PATENT DOCUMENTS

| 3,874,150 A | * 4/1975 | Boeck ............................ 56/15.9 |
| 4,779,406 A | * 10/1988 | Schroeder ..................... 56/15.9 |
| 5,079,907 A | * 1/1992 | Sameshima et al. .......... 56/15.9 |
| 5,355,665 A | * 10/1994 | Peter ........................... 56/17.1 |
| 5,410,865 A | * 5/1995 | Kurohara et al. ............. 56/15.9 |
| 5,459,984 A | * 10/1995 | Reichen et al. .............. 56/15.2 |
| 5,475,971 A | * 12/1995 | Good et al. ................... 56/15.2 |
| 5,784,870 A | * 7/1998 | Seegert et al. ............... 56/17.1 |
| 5,816,033 A | * 10/1998 | Busboom et al. ............. 56/15.2 |
| 5,816,035 A | * 10/1998 | Schick ......................... 56/15.2 |
| 5,915,487 A | * 6/1999 | Splittstoesser et al. ...... 180/19.1 |
| 5,927,055 A | * 7/1999 | Ferree et al. ................. 56/15.9 |
| 6,012,274 A | * 1/2000 | Eavenson et al. ............ 56/320.1 |
| 6,023,921 A | * 2/2000 | Burns et al. .................. 56/17.1 |

OTHER PUBLICATIONS

Brochure Bob–Cat® ZT 200 Series, by Ransomes Bob–Cat, No Date.
Brochure Country Clipper® Zero Turn Mowers, by Shivvers, Mfg., No Date.
Brochure Country Clipper® Mid MOunt Mower, by Shivvers, Mfg., No Date.
Brochure Country Clipper Flip Up Deck, by Shivvers, Mfg., No Date.
Brochure Z48, by Encore.
Brochure ZTR 5000 Serial, by Dixon, No Date.
Brochure Exmark Lazer A® HP, by Exmark, No Date.
Brochure Pro Cut Z's by Ferris Industries, Inc., No Date.
Brochure ZT MAX®, by F.D. Kees Manufacturing Co., No Date.
Brochure Snapper Yard Cruiser®, by Snapper, No Date.
Brochure Twister BZT Zero–Turning–Radius Riding Mower, by Bunton, Division of Jacobsen, No Date.
Brochure Great Dane® "Zero Turn Chariot", by Great Dane Power Equipment, Inc., No Date.
Brochure Prowler, by encore Power Equipment, No Date.
Brochure MTD Pro MNZ wide–area mower, by MTDpro, No Date.
Brochure IS® First With Independent Suspension, by Ferris Industries, No Date.

* cited by examiner

Primary Examiner—Robert E. Pezzuto
Assistant Examiner—Nathan Mammen
(74) Attorney, Agent, or Firm—John C. McMahon

(57) ABSTRACT

A self-propelled mower includes a frame and a mower housing mounted underbelly relative to the frame by a mounting assembly. The mounting assembly allows the mower housing to be disconnected from the frame and swung near the front of the housing from a mowing configuration to an access configuration as a front end of the mower is raised. The frame includes a yoke that receives a nose of the housing, as the front of the mower is raised.

10 Claims, 4 Drawing Sheets

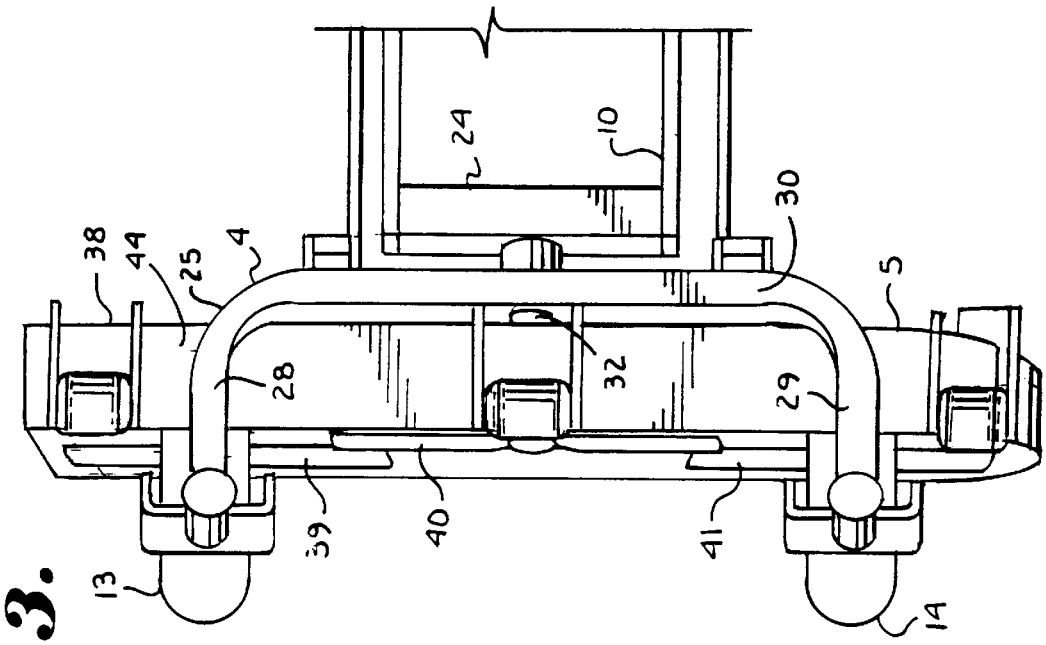
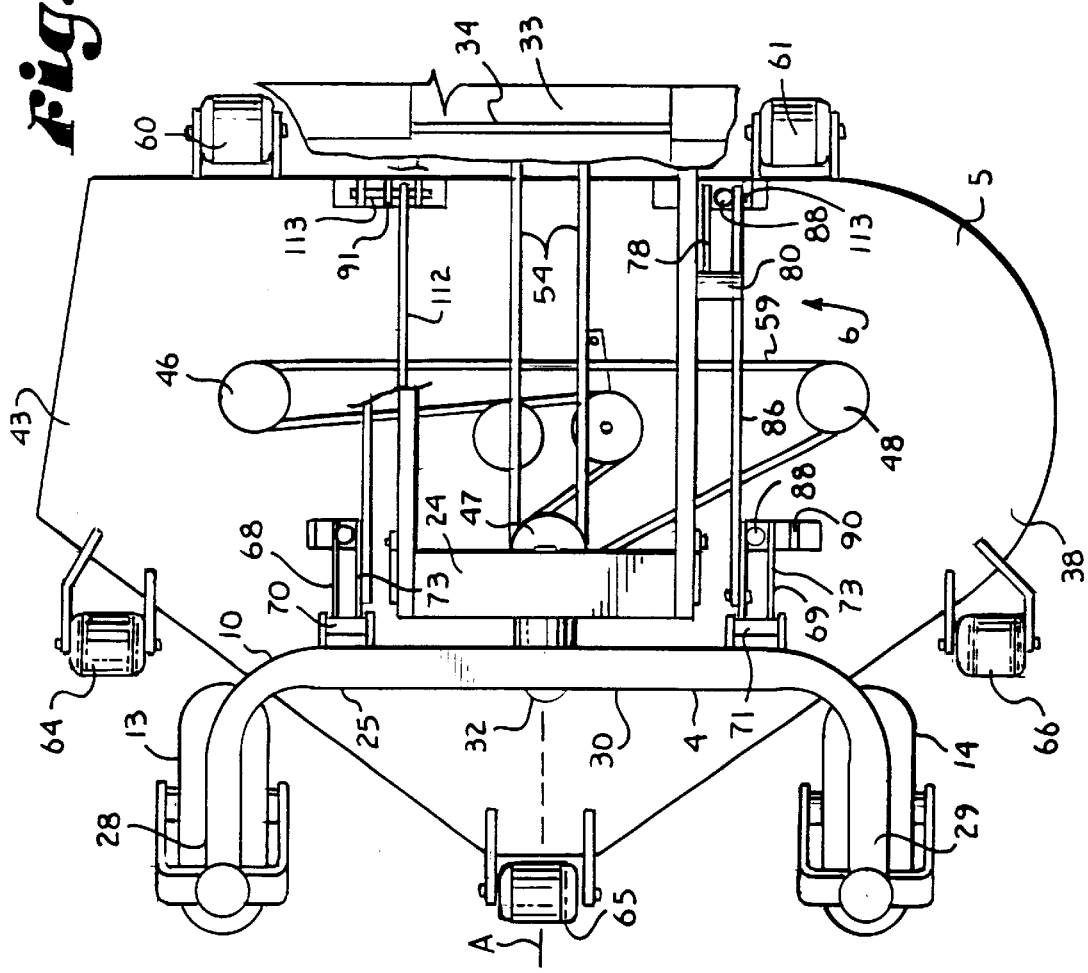

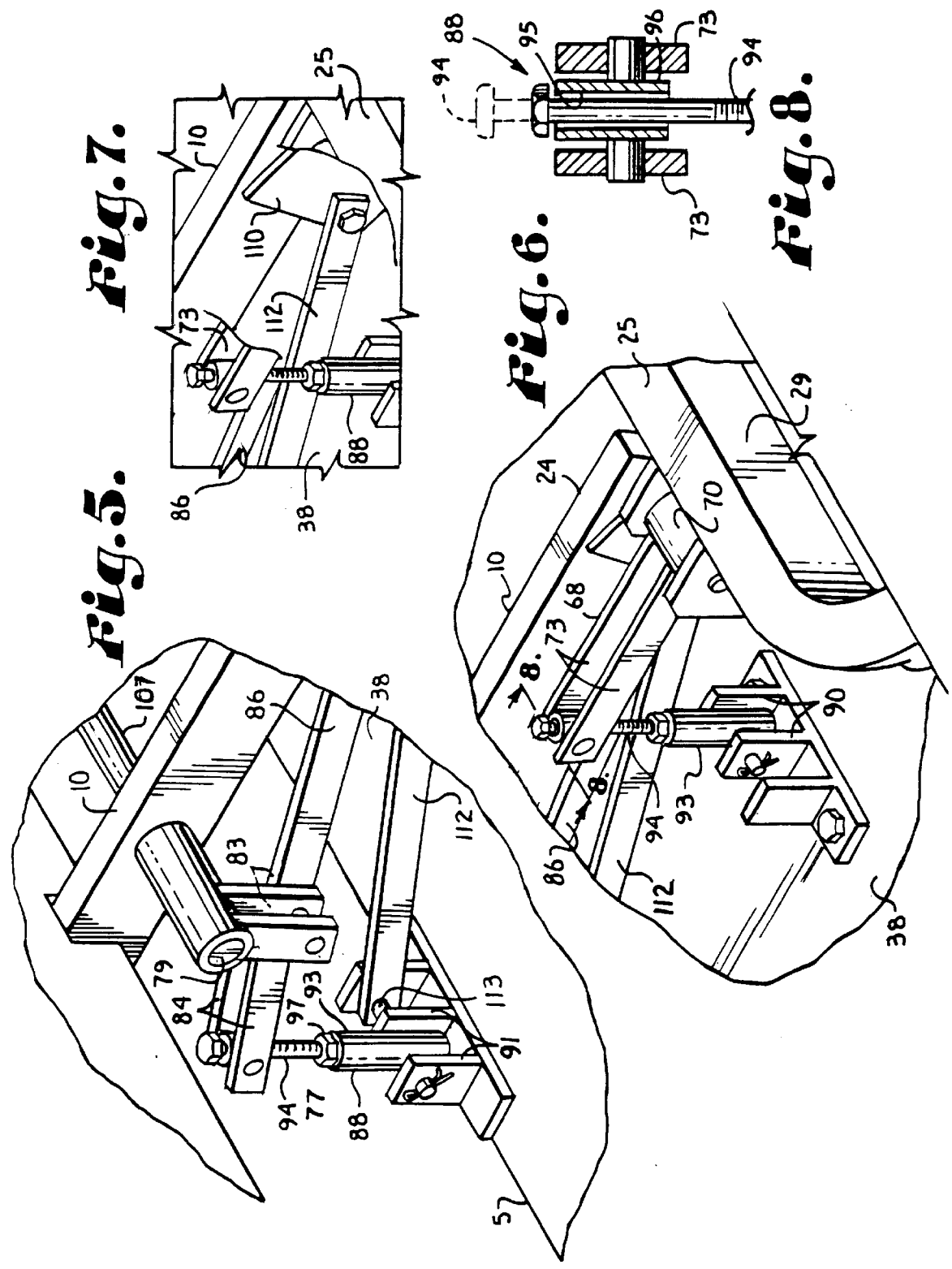

RAISEABLE MOWER DECK

BACKGROUND OF THE INVENTION

The present invention is directed to an underbelly mower for use in conjunction with a tractor and which is easily moveable between a mowing position and a blade accessible position that allows a user to easily perform mechanical work on the underside of the mower.

Self propelled mowers are generally either of the self contained type where a mower is mounted directly on a tractor or the trail-behind type in which the mower is propelled by a tractor. Of the self-contained type, the mower is normally of two types which are forward deck mounted or underbelly mounted. Each type has its benefits and associated problems. One of the problems with the underbelly type is that the mower is mounted beneath the tractor, and it is very difficult to get to the underside of the mower, especially the cutting blades, for repairs and the like.

In prior art underbelly mowers, an operator has to raise the tractor off the ground as they would a car, raise the front end of the tractor until the tractor rests on its rear or completely disassemble the mower unit and remove it in order to perform repair such as changing blades, cleaning or the like. None of these methods have worked very satisfactorily. This is especially a problem when the operator is in the field and does not have jacks and other heavy tools to assist the operator. Commercial mower operators, who often must access the underside of the mower at least twice a day, often to change cutting blades, find such mowers to be especially troublesome.

Therefore, it was found to be desirable to have a mower that provides the benefits of an underbelly mower, yet is relatively easy to convert to an accessible configuration. Furthermore, it was desired to provide such a mower that does not require expensive or cumbersome jacking or lifting equipment and that can easily be converted to the accessible configuration on the job by a single operator.

SUMMARY OF THE INVENTION

The present invention provides a mower having a mobile tractor with a frame and an underbelly mower assembly deck or housing that is mounted beneath the frame. The mower housing is connected to the frame by a mounting housing that allows an operator to adjust height of the overall mower assembly, to finely adjust the mowing height of one corner of the mower housing relative to other corners, and to transfer ground traversing driving force from the tractor to the mower housing. Of particular importance to the invention, the mounting assembly also allows the mower housing to be easily and quickly partially disconnected from the frame such that the mower housing can rotate at the rear thereof from a mowing configuration to a blade access configuration.

In order for the housing to be able to rotate, the front or nose of the mower housing is shaped and configured to be received in a yoke associated with the frame. After the front of the mower is raised and the housing rotates to the access configuration, the nose also mates with the yoke in an over center configuration while an operator works on the underside of the housing.

The mounting assembly includes a set of four hangers to hang each corner of the housing from the frame. The rear hangers are easily disconnected such that in conjunction with removal of a main drive belt the housing is free to swing. The housing is also connected to the frame by drag links on either side of the housing that transfer propulsion to the mower housing from the tractor. The drag links are configured, sized and shaped in conjunction with the front hangers to allow the housing to swing relative to the frame without binding.

OBJECTS AND ADVANTAGES OF THE INVENTION

Therefore the objects of the present invention are: to provide a mower comprising a tractor and a mower assembly mounted under a frame of the tractor; to provide such a mower wherein the mower assembly is easily converted between a mowing configuration and an access configuration wherein the underside of the mower is accessible to an operator for repair and the like; to provide such a mower that does not require jacks or other lifting equipment to be placed in the access configuration; to provide such a mower wherein the mower apparatus is swingable to the access configuration by manual lifting of the front of the tractor and held in the access configuration by an over center relationship between the tractor and the mower apparatus; to provide such a mower wherein the mower apparatus is height adjustable from a driver's seat; to provide such a mower wherein the mower apparatus is pulled by a strap or link located on each side of the mower and wherein rear hangers are easily disconnected to allow the mower apparatus to rotate to the access configuration relative to the tractor; to provide such a mower wherein the tractor has a frame that allows a portion of the mower apparatus to rotate through the frame when moving to the access configuration; and to provide such a mower that is relatively inexpensive to produce, simple to operate and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a fragmentary and enlarged top plan view of the mower with the mowing assembly in the mowing configuration.

FIG. 4 is a fragmentary and enlarged top plan view of the mower with the mowing assembly in the access configuration.

FIG. 5 is a fragmentary and enlarged perspective view of the mower showing one side of a rear portion of a mounting assembly for the mower assembly.

FIG. 6 is a fragmentary and enlarged perspective view of the mower showing one side of a front portion of the mounting assembly for the mower assembly.

FIG. 7 is a view similar to FIG. 6 with portions broken away to show detail thereof.

FIG. 8 is an enlarged and fragmentary cross-sectional view of a hanger of the mower, taken along line 8—8 of FIG. 6.

DETAILED DESCRIPTION OF THE INVENTION

Figure 1:
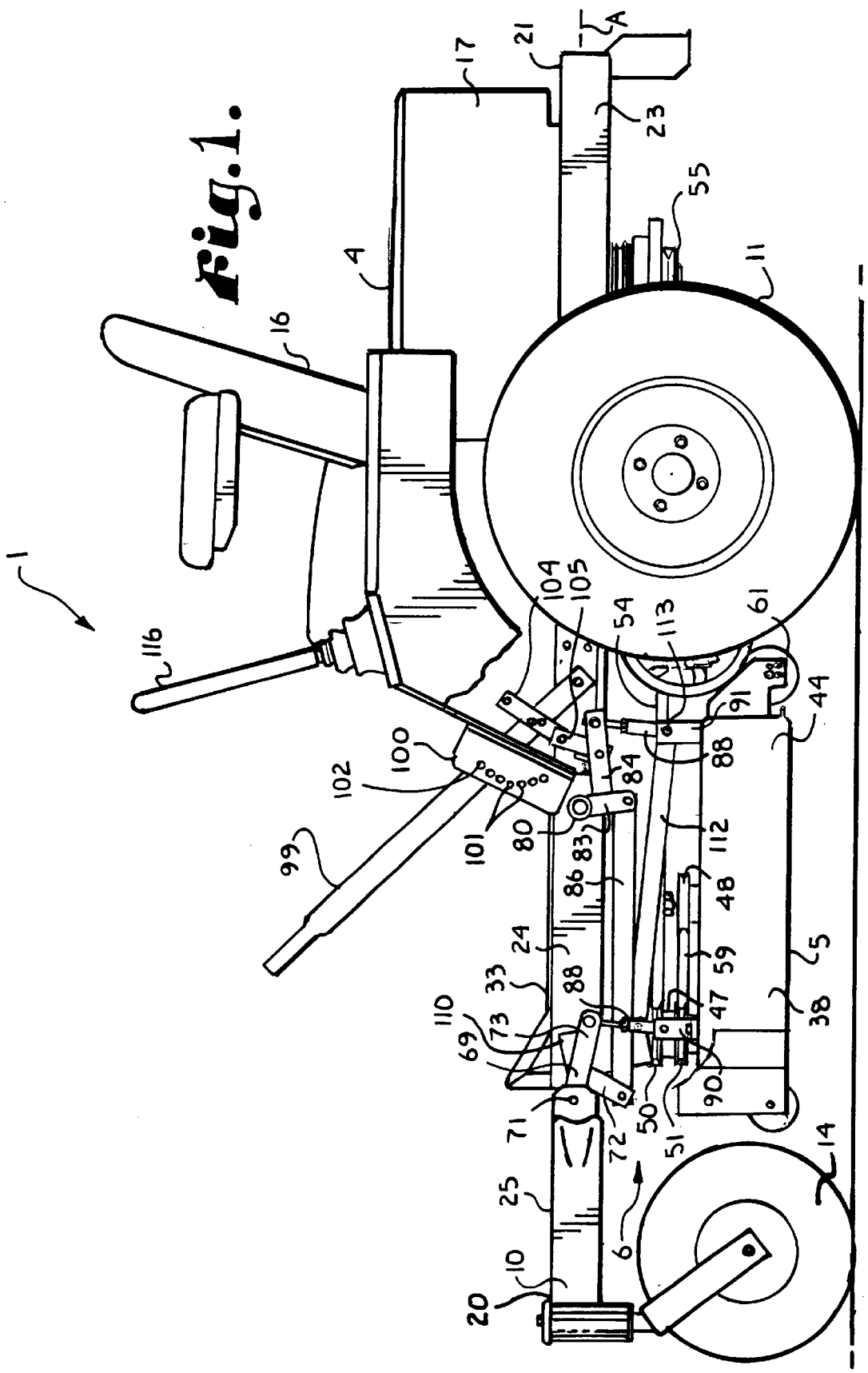
FIG. 1 is a side elevational view of a mower according to the present invention, showing a mower assembly thereof in a mowing configuration thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an underbelly mower apparatus in accordance with the present invention. The mower 1 comprises a mobile, self-propelled tractor 4, a mower assembly 5 and a mounting assembly 6.

The tractor 4 includes a tractor or vehicle frame 10 supported on a pair of independently driven rear wheels 11 and a pair of front wheels 13 and 14. Supported on the frame 10 is an operator's seat 16 and a gasoline engine 17. As can be seen from FIG. 1, most of the bulk of the structure supported by the frame 10, and the weight associated therewith is positioned behind or over the rear wheels 11 and 12. While a particular tractor 4 has been illustrated with the present invention, tractors having different configurations will function with the invention provided swingable requirements noted below are met.

Figure 2:
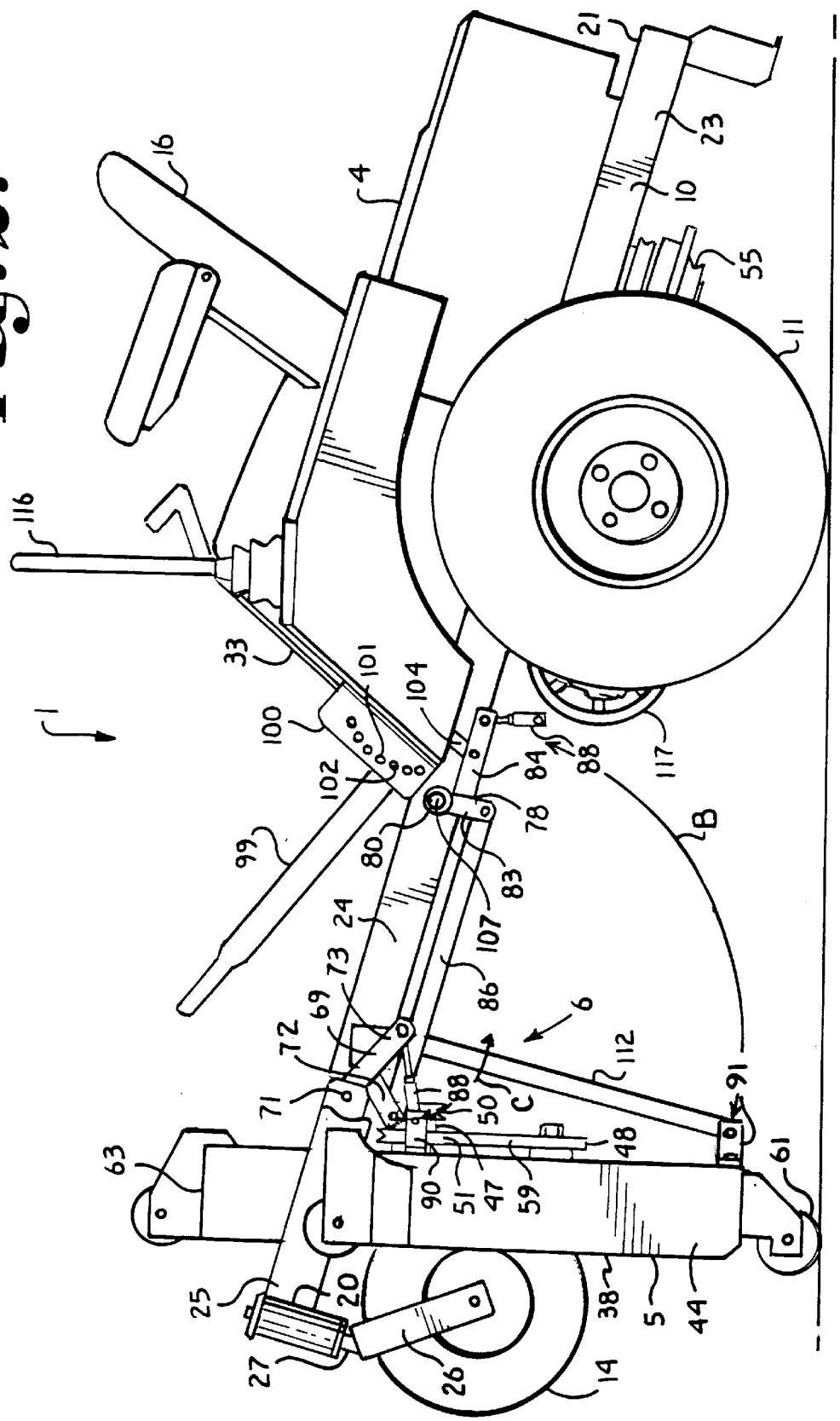
FIG. 2 is a side elevational view of the mower with the mower assembly shown in an access configuration thereof.

The frame 10 has a central elongate axis A extending from a front 20 to a rear 21 of the frame 10. As the frame 10 is raised in the front 20, it is desirable that the rear 21 remain clear of the ground, as seen in FIG. 2. The frame 10 has a rectangular rear section 23 supporting the engine 17 and seat 16 and a rectangular middle section 24 (FIG. 2) rigidly fixed to the rear section 23. The frame 10 further includes a forward yoke 25. The front wheels 13 and 14 are each respectively pivotally mounted by a caster clevis 26 and a pivot pin 27 on the distal ends of opposite arms 28 and 29 of the yoke 25 that are in turn joined by a laterally extending cross-member 30 forming a large U-shaped configuration.

The cross-member 30 is centrally pivotally connected to the middle section 24 by a pivot pin 32 that allows the forward yoke 25 to pivot about the axis A relative to the rest of the frame 10 and thereby allows the front wheels 13 and 14 to follow terrain independent of the rear wheels 11.

A foot plate 33 is pivotally connected to the frame 10 near the rear of the tubular member 24 by a hinge 34 (FIG. 3). The foot plate 33 has a lowered position (FIG. 1) whereby the plate 33 is adapted to support the feet of an operator and a raised position (FIG. 2) so as to allow easy access to the top of the mower assembly 5.

The mower assembly 5 includes an open bottom deck or housing 38 surrounding three mower blades 39, 40 and 41 (FIG. 4). The housing 38 includes a top plate 43 and a sidewall 44 depending from the periphery of the top plate 43. Each of the blades 39, 40 and 41 is pivotally mounted in the top plate 43 by bearings and have attached thereto a respective drive pulley 46, 47 and 48. The middle drive pulley 47 includes two separate pulley sections 50 and 51 (FIG. 1). The upper pulley section 50 is operably joined by a conventional V-shaped and flexible drive belt 54 (FIG. 3) to a pulley 55 on the engine 17, so as to operably drive the blades 39, 40 and 41 when the pulley 55 is engaged. A transmission (not shown) between the engine pulley 55 and the engine 17 allows an operator to selectively simultaneously engage the blades 39, 40 and 41 through a control (not shown).

A second drive belt 59 is received about pulleys 46 and 48 as well as the middle pulley lower pulley section 51 to operably drive all three blades 39, 40 and 41 simultaneously.

A pair of ground following rollers 60 and 61 are mounted at the rear of and depending from the housing sidewall 44. The rollers 60 and 61 help prevent ground scalping and also assist in the raising of the front of the tractor 4, as the rollers 60 and 61 allow the rear of the housing 38 to roll along the ground without digging into the ground and alternatively a drag plate may be used for this purpose. Three rollers 64, 65 and 66 are also attached to and located along the front of the housing sidewall 44.

The housing 38 has a nose section 63 that is shaped and configured to be received within the forward yoke 25, when the mower assembly 5 is in an access configuration thereof, as seen in FIG. 2. When in the access configuration, the nose 63 butts against the cross-member 30 and/or the pin 32 in a stable over center alignment such that the center of gravity of the mower housing 38 is positioned forward of the junction of the housing 38 with the yoke 25 and the housing 38 is tilted rearward from bottom to top in the access configuration to thereby, in conjunction with friction, maintain the access configuration and prevent unintended collapse.

The mounting assembly 6 functions to allow an operator to adjust the cutting height of the blades 39, 40 and 41 simultaneously, to adjust the level of the housing 38 on either side of the front and rear to position each blade 39, 40 and 41 to cut at the same height, to allow the housing 38 to adjust for uneven terrain, and to allow the frame 10 to pull rather than push the housing 38.

The mounting assembly 6 includes a pair of L-shaped members or bell cranks 68 and 69 (FIG. 3) that are pivotally connected to opposite sides of the yoke 25. Each of the L-shaped members 68 and 69 is attached near the apex thereof to the yoke 25 by pivots 70 and 71 and each have a pair of bifurcated arms 72 and 73. A similar set of L-shaped members or bell cranks 77 (FIG. 5) and 78 (FIG. 3) are connected near apexes thereof by pivot pins 79 (FIG. 5) and 80 to near the rear of the middle section 24 of the frame 10. Each of the L-shaped members 77 and 78 include a pair of bifurcated arms 83 and 84.

Referring to FIG. 1, on each side of the mower 1 arms 72 and 83 are pivotally joined by connecting links 86. Each of the arms 73 and 84 is pivotally connected to one end of a hanger 88. An opposite end of each hanger 88 is pivotally connected to the mower housing 38 respectively by front tabs 90 and rear tabs 91.

Referring to FIGS. 5 and 6, each of the hangers 88 includes a lower shaft 93 threadedly receiving an upper screw 94. Each of the screws 94 is slidingly received in a bore 95 (FIG. 8) in a pivot element 96. A lock nut 97 allows loosening of the screw 94 relative to the shaft 93 so that the screw 94 can be rotated to either lengthen or shorten the hanger 88 and then the nut 97 is retightened. In this manner each hanger 88 functions similar to a turnbuckle, and the relative height of each corner of the housing 38 may be adjusted at each of the corners thereof. The housing 38, due to the gravity tends to hold the housing 38 downwardly; however, when the mower 1 crosses uneven ground, corners of the housing 38 can be urged upwardly as the associated screw 94 moves up and down in the bore 95. In addition each of the hangers 88 is pivotally mounted near the bottom and top thereof allowing substantial articulation with respect to pivoting in a front rear plane.

An operator height adjustment control arm 99 (FIGS. 1 and 2) is pivotally joined to the frame 10 at one end thereof and extends outwardly at the opposite end to be graspable by the operator. A latch plate 100 having a plurality of apertures 101 is also connected to the frame 10. The control arm 100 has a lug 102 thereon that is selectively positionable in the various apertures 101 to operably set the overall desired cutting height of the mower 1. A cross link 104 is also fixedly secured to the control arm 99. A second cross link 105 is pivotally attached near one end to the cross link 104 and near an opposite end to the L-shaped member arm 84. The L-shaped members 77 and 78 are fixedly linked by a pivot rod 107 such that both rotate in unison.

In this manner as the control arm 99 is moved by an operator, the housing 38 is raised or lowered correspondingly to set the cutting height of the mower 1.

A support plate 110 (FIGS. 1 and 7) is fixedly attached to and depends from the front of each side of the frame middle section 24. A drag link 112 pivotally attached near one end thereof to a respective support plate 110 and is disconnectably and pivotally connected near the opposite end to a respective rear tab 91 by a pin 113, also connecting the associated rear hanger 88 to the rear tabs 91. The drag link 112 operably pulls the housing 38 along as the mower frame 10 moves and as the housing 38 is supported by the hangers 88. The pin 113 is readily removed to disconnect the link 112 from the housing 38. It is foreseen that other quick connect attachments may be utilized for connecting the link 112 to the housing 38.

The placement of the support plate 110 is important as the drag link 112 must be able to rotate without binding as the housing 38 moves between a mowing configuration shown in FIG. 1 and the access configuration shown in FIG. 2.

The mower 1 includes operator directional control arms 116 that allow an operator to control both the forward and reverse movement of the rear wheels 11 independently through hydraulic transmissions 117. Turning is controlled by stopping or slowing one rear wheel 11 which operating the other rear wheel 11 at a faster speed. It is foreseen that a rigid latchable strap may also be used to stabilize the mower housing 38 in the accessible configuration. Such a strap would extend between the housing 38 and the frame 10 to form a triangular configuration when latched with the housing 38 in the position of FIG. 2. Such a strap could then be unlatched to allow the housing 38 to return to the mowing configuration in FIG. 1.

The present invention is directed to a mower 1 having an underbelly mowing assembly 5 that is quickly and easily moveable between the mowing and access configurations thereof. As used herein, the term underbelly means a mower 1 having a mower assembly 5 that is mounted so the center of the mower housing 38 is under the mower frame 10 and such that the mower housing 38 does not extend extensively frontward or rearward of the frame 10, although the mower assembly 5 normally extends laterally to the sides of the mower frame 10. Normally the term "underbelly" also means that the mower housing is located between the front wheels 13 and 14 and the rear wheels 11.

In order to move from the mowing configuration to the access configuration, the foot plate 33 is first raised, and the drive belt 54 is rolled off the pulley upper section 50. The pins 113 securing the rear hangers 88 to the rear tabs 91 are removed sufficiently to disconnect the hangers 88 but leave the drag links 112 connected. Thereafter, the operator simply raises the front of the mower 1 allowing the housing 38 to rotate forward and downward at the rear thereof to the access position seen in FIG. 2 and 4. In doing so the nose section 63 becomes positioned between the yoke arms 28 and 29 and against the cross member 30. The housing 38 in this position is preferably positioned such that the housing's center of gravity is forward of the location whereat the housing 38 engages the yoke cross-member 30, the pivot points where the front hangers 88 engage the front tabs 90 and the pivot point where the drag links 112 connect to the support plates 110. In this manner the access configuration is very stable and the operator can change blades or perform other functions on the underside of the housing 38. In the access configuration the size, shape and geometry of the nose 63 and yoke 25 prevents the housing 38 from folding over on the top thereof.

To reverse and move from the access configuration to the mowing configuration, the operator pushes with the operator's foot rearwardly on the rear of the housing 38 near the rollers 60 and 61 and simultaneously lowers the nose 63. The rear hangers 88 and main drive belt 54 are reconnected and the mower 1 is again ready for operation.

In moving from the mowing configuration to the access configuration, it is seen that the bottom of each of the drag links 112 rotate through a long arc B having a comparatively long radius while the bottom of the front hangers 88 rotate through a much shorter arc C having a comparatively much shorter radius.

It is noted that the lowermost portion of the frame rear end 21 is positioned so that when the housing 38 is moved to the access configuration that the rear end 21 does not engage the ground (FIG. 2). It is also noted that the apparatus 1 in general rotates about the axles of the rear wheels 11 when the housing is raised to the access configuration.

It is foreseen in accordance with the invention that the mower drive belt 55 could be replaced by other drive mechanisms that would still allow the housing 38 to be raised. For example, a direct drive with a telescoping drive shaft could be utilized to connect the motor to the blade pulleys.

It is also seen that in accordance with the invention the mower housing may be supported on its own wheels in which case the housing would be drawn by the tractor by links, such as the illustrated links 112 or the like, in which case hangers would not be required. If the housing is self supporting, the housing would be positioned in an over center alignment when in the access configuration or a latch member between the housing and the tractor frame or chocks may be utilized about the wheels to hold the housing in the access configuration.

It is also foreseen that the mower housing could be rotated 180 degrees such that the nose is in the rear. In such an embodiment, the nose would not be received in the yoke and a latch member, chocks or the like would be required to stabilize the device in the access configuration.

It is still further foreseen that three hangers (either two front and one rear or two rear and one front) could be utilized instead of the illustrated four hangers in some embodiments.

In some embodiments it may also be desirable to have the drag links be disconnectible or that push links may be used instead of drag links in such cases a latch member, over center positioning and/or chocks may be utilized to stabilize the housing in the access configuration. Also there may be only a single drag link instead of the two shown in the illustrated embodiment. Further, the drag links limit swinging of the housing on the hangers and it is foreseen that the drag links may be eliminated if the swinging is not of concern and an alternate structure is provided to stabilize the housing in the access configuration.

While adjustable hangers are shown in the illustrated embodiment, the relative height of the mower housing corners may be preset in which case the hangers would not be adjustable.

Also, instead of the apparatus being raised to the access configuration manually, it is foreseen that a powered device or mechanical advantage device such as a hydraulic lift or jack may be used to raise the front of the tractor. Preferably, the weight of the overall apparatus is distributed such that the weight to the rear of the rear tires is almost as great as that to the front of the rear tires thereof to make lifting easier whether the lifting is accomplished manually or mechanically.

It is to be understood that while certain forms of the present invention have been illustrated and described herein, it is not to be limited to the specific forms or arrangement of parts described and shown.

What is claimed and desired to be secured by Letters Patent is as follows:

1. A mower having:
   a) a mobile frame mounted on front and rear wheels;
   b) a mower assembly having a mower housing mounted underbelly relative to said frame and mainly located from front to rear between said front and rear wheels during operation; and
   c) a mounting assembly mounting said mower assembly to said frame; said mounting assembly including a pair of spaced front hangers and a pair of spaced rear hangers operably hanging said mower assembly from said frame; said rear hangers being disconnectable; said mounting assembly also including a pair of spaced drag links connecting each side of said mower assembly to said frame to operably convey forward propulsion from said frame to said mower assembly; said drag links being positioned and configured with said front hangers to allow a rear of said housing to swing downwardly and forwardly relative to a frame of said housing, such that said housing moves between a mowing configuration and an access configuration wherein an underside of said deck is exposed when said rear hangers are disconnected and said deck opposite said rear hangers is raised.

2. The mower according to claim 1 wherein:
   a) said frame includes a front U-shaped yoke and said housing has a nose; said housing nose being received in said yoke when said housing is in the access configuration thereof.

3. The mower according to claim 2 wherein:
   a) said yoke is shaped and configured to abuttingly receive said housing nose when said housing is in the access configuration thereof to stabilize said access configuration.

4. The mower according to claim 3 wherein:
   a) said housing when in said access configuration having a top that is positioned so as to be tilted such that a lower end thereof is forward of an upper end thereof that is associated with said nose and abuts said yoke to form an over center alignment.

5. The mower according to claim 1 wherein:
   a) said drag links are substantially longer than said front hangers such that a front portion of said housing connected to said frame by said front hangers rotates through a substantially smaller arc than the rear of the housing that is connected to said frame by said drag links when moving between said mowing and access configuration.

6. A mower apparatus comprising:
   a) a self propelled mobile frame having a front and rear supported by front and rear wheels; said frame including a front yoke;
   b) a mower apparatus having a housing with a top and a sidewall enclosing at least one cutting blade; said housing having a front and rear; said housing being mounted underbelly relative to said frame, such that the front of said housing is mainly behind said front wheels and the rear of said housing is mainly in front of said rear wheels during operation; said housing having a forward nose;
   c) a mounting assembly connecting said housing to said frame; said mounting assembly having a pair of laterally spaced front hangers and a pair of laterally spaced rear hangers each of said hangers being attached to a respective bell crank pivotally mounted on said frame; each of said bell cranks being joined to rotate in unison and also being connected to a control lever to allow an operator to rotate said bell cranks to move said hangers between raised and lower configurations thereof and thereby raise and lower said housing relative to said frame; each of said hangers having a maximum length, to limit spacing of said housing from said frame, but being movable upward to allow said housing to become closer to said frame such as to allow said housing to be adapted to rise over uneven terrain; said mounting assembly also including a pair of laterally spaced drag links; said drag links operably pulling said housing forward as said frame moves forward during mowing; said drag links being longer than said front hangers and pivotally secured to said housing near the rear of said housing; said rear hangers being selectively disconnectable from said housing, such that when said rear hangers are disconnected from said housing and the front of said frame is raised to pivot about said rear wheels, the rear of said housing moves forward and downward compared to a front of said housing while said housing pivots on said front hangers and said drag links from a mowing configuration to an access configuration wherein an underside is accessible and said housing nose is received in and supported by said yoke.

7. The apparatus according to claim 6 wherein:
   a) said front hangers and said drag links are sized and positioned such that said housing tilts rearwardly at a top as compared to a bottom thereof when in the access configuration and said nose abuts against said yoke so as to provide a stable over center alignment.

8. A self-propelled mower comprising:
   a) a tractor adapted to traverse ground; said tractor having a frame; said frame having a front yoke;
   b) a mower assembly having a mower housing underbelly mounted relative to said frame; said housing including a nose;
   c) said nose being shaped and configured to be receivable within said yoke, when said housing is in the access configuration thereof; and
   d) a mounting assembly connecting said housing to said frame; said mounting assembly including a hanger that connects a rear of said housing to said frame; said hanger adapted to be selectively disconnectable to enable a rear of said housing to swing downward and forward compared to a front of said housing so as to be moveable from a mowing configuration to an access configuration when said hanger is disconnected.

9. The mower according to claim 8 wherein:

a) said nose and said yoke are shaped and sized such that said nose is received in and abutting said yoke when said housing is positioned in an over center alignment such that said mower is stable in said access configuration.

10. A self-propelled mower comprising:

a) a tractor adapted to traverse ground; said tractor having a frame and at least one front wheel and one rear wheel mounted on said frame with said frame being rigid between said front and rear wheels;

b) said mower frame includes a front yoke;

c) a mower assembly having a mower housing underbelly mounted relative to said frame such that from front to rear said mower assembly is mainly located between said front and rear wheels during operation;

d) said housing includes a nose;

e) said nose is shaped and configured to be receivable within said yoke when said housing is in an access configuration thereof; and f) a mounting assembly connecting said housing to said frame; said mounting assembly including a hanger that connects a rear of said housing to said frame; said hanger adapted to be selectively disconnectable to enable a rear of said housing to swing downward and forward compared to a front of said housing so as to be moveable from a mowing configuration to said access configuration when said hanger is disconnected.

* * * * *